(12) United States Patent
Yu

(10) Patent No.: US 10,311,523 B2
(45) Date of Patent: Jun. 4, 2019

(54) APPARATUS AND METHOD FOR PROVIDING ACCOUNT BOOK SERVICE

(71) Applicant: NAVER CORPORATION, Seongnam-si (KR)

(72) Inventor: Jung Hyon Yu, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 250 days.

(21) Appl. No.: 15/053,188

(22) Filed: Feb. 25, 2016

(65) Prior Publication Data

US 2016/0260179 A1  Sep. 8, 2016

(30) Foreign Application Priority Data

Mar. 4, 2015 (KR) .................. 10-2015-0030550

(51) Int. Cl.
G06Q 40/00 (2012.01)
H04L 12/58 (2006.01)

(52) U.S. Cl.
CPC ........... G06Q 40/128 (2013.12); H04L 51/18 (2013.01)

(58) Field of Classification Search
CPC combination set(s) only.
See application file for complete search history.

(56) References Cited

U.S. PATENT DOCUMENTS

| 7,856,388 B1* | 12/2010 | Srivastava | G06F 17/30569 705/35 |
| 8,396,769 B1* | 3/2013 | Selig | G06Q 40/06 705/35 |
| 8,417,258 B2* | 4/2013 | Barnes, Jr. | G06Q 10/1053 455/414.3 |
| 8,527,357 B1* | 9/2013 | Ganesan | G06Q 30/06 705/26.1 |

(Continued)

FOREIGN PATENT DOCUMENTS

JP  2002-117220 A  4/2002
KR  10-1999-0058000 A  7/1999

(Continued)

OTHER PUBLICATIONS

Office Action issued in corresponding Japanese Patent Application No. 2016-031875, dated Apr. 4, 2017.

(Continued)

*Primary Examiner* — Fateh M Obaid
(74) *Attorney, Agent, or Firm* — Greer Burns & Crain, Ltd.

(57) ABSTRACT

An account book service providing apparatus using a messaging service includes a first data receiver configured to receive first data input into a messenger chat window displayed on a terminal of a user, the first data including an income or expenditure detail; a second data processor configured to extract second data having a preset format from the first data and store the second data; an account book data storage unit configured to store the second data to be mapped (Continued)

to the user; a third data extractor configured to extract third data to reflect the second data, the third data including the sum of a total or some of the second data; and a data transmitter configured to transmit the second data or the third data to the terminal of the user so as to display the second data or the third data on the terminal of the user.

19 Claims, 8 Drawing Sheets

(56) References Cited

U.S. PATENT DOCUMENTS

| | | | | |
|---|---|---|---|---|
| 8,744,948 | B1* | 6/2014 | McVickar | G06Q 40/12 705/31 |
| 8,812,625 | B1* | 8/2014 | Chitilian | H04L 29/08981 707/802 |
| 9,118,779 | B2* | 8/2015 | Gupta | H04M 15/00 |
| 2004/0030992 | A1* | 2/2004 | Moisa | G06Q 10/06 715/234 |
| 2006/0271381 | A1* | 11/2006 | Pui | G06Q 10/06311 705/7.13 |
| 2012/0330718 | A1 | 12/2012 | Jain et al. | |
| 2014/0282016 | A1* | 9/2014 | Hosier, Jr. | H04W 4/08 715/733 |
| 2014/0372650 | A1* | 12/2014 | Caskey | H04L 51/00 710/261 |
| 2015/0178846 | A1* | 6/2015 | Feinschreiber | G06Q 40/06 705/36 R |
| 2015/0371173 | A1* | 12/2015 | Jalali | G06Q 10/06311 705/7.14 |
| 2016/0255139 | A1* | 9/2016 | Rathod | H04L 67/22 709/203 |
| 2016/0321719 | A1* | 11/2016 | Gazy | G06Q 30/0609 |
| 2016/0337520 | A1* | 11/2016 | Konigsberg | H04M 3/5191 |

FOREIGN PATENT DOCUMENTS

| | | |
|---|---|---|
| KR | 10-2009-0102947 A | 10/2009 |
| KR | 2014-517436 A | 7/2014 |
| KR | 10-2014-0123642 A | 10/2014 |

OTHER PUBLICATIONS

Korean Office Action dated Feb. 16, 2015 issued in corresponding Korean Patent application No. 10-2015-0030550.

* cited by examiner

APPARATUS AND METHOD FOR PROVIDING ACCOUNT BOOK SERVICE

CROSS-REFERENCE TO RELATED APPLICATION

This application claims the benefit of Korean Patent Application No. 10-2015-0030550, filed on Mar. 4, 2015, in the Korean Intellectual Property Office, the disclosure of which is incorporated herein in its entirety by reference.

BACKGROUND

1. Field

One or more exemplary embodiments of the present invention relate to an apparatus and a method for providing an account book service, and more particularly, to an account book service which is in a messenger service. When a user transmits an income/expenditure detail to an account book service providing apparatus by inputting the income/expenditure detail in a simple dialogue form into a chat window between the user and a virtual account book manager, the account book service providing apparatus automatically converts the income/expenditure detail into an appropriate format, stores and updates the income/expenditure detail in an account book database. The account book service providing apparatus displays the gathered data, such as accumulated expenditure details of a target month, in the chat window between the user and the account book manager, so that the user may easily check the income/expenditure details.

2. Description of the Related Art

With advancements in electronic communication technology, users have become able to use various functions with devices capable of conducting electronic communication. These devices may be a personal computer (PC), a portable terminal, etc. The utilization of these devices is high because various programs may be installed in or deleted from the devices as users desire and the devices may directly access a communication network via a wireless Internet.

A plurality of devices may exchange data with one another via communication network. Thus, messenger services have been actively developed and used, whereby a plurality of users may communicate with one another by exchanging messages respectively prepared by the plurality of devices with one another and displaying the messages on the devices.

Information disclosed in this Background section was already known to the inventors before achieving the inventive concept or is technical information acquired in the process of achieving the inventive concept. Therefore, it may contain information that does not form the prior art that is already known to the public in this country.

SUMMARY

One or more exemplary embodiments include an account book service providing apparatus and method capable of enabling a user to freely input account book items regardless of the method and order, and automatically updating an account book by extracting dates, the amount of money, and details based on the freely input account book items.

One or more exemplary embodiments include an account book service providing apparatus and method capable of displaying dates, the amounts of money, and details arranged in real time based on a value of a character string input by a user, so that the user may input desired financial transaction results by inputting a minimum number of items.

One or more exemplary embodiments include an account book service providing apparatus and method capable of displaying the total sum of expenditure details for a predetermined time period on a user terminal along with details input by a user, so that the user may more easily manage expenditures.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
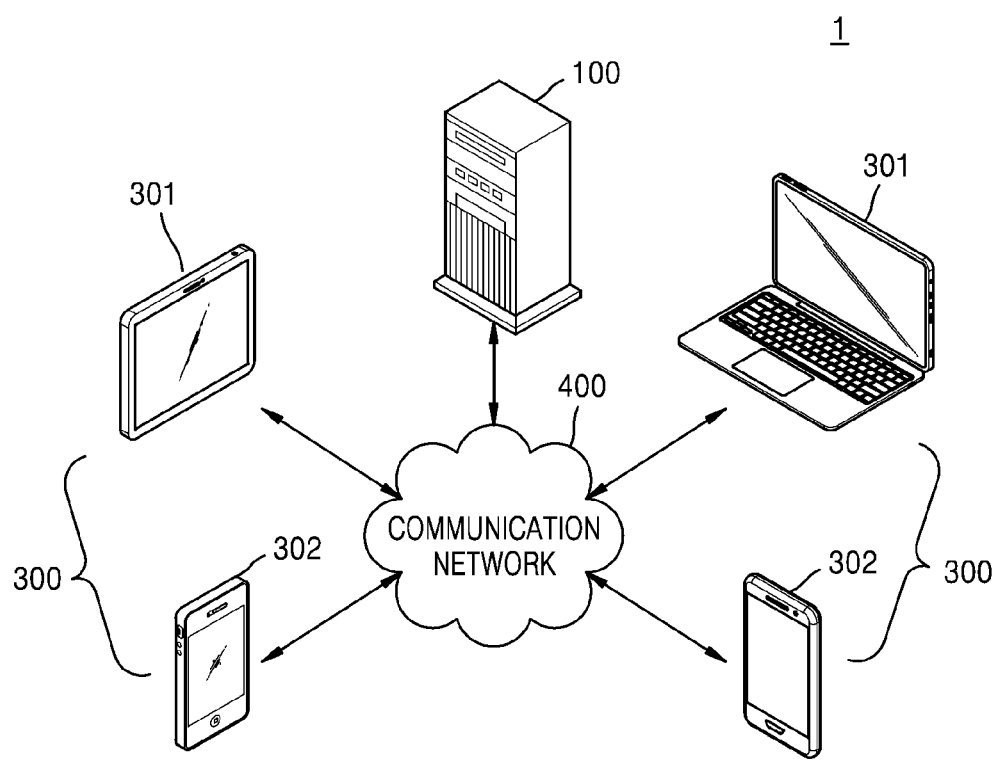
FIG. 1 is a diagram illustrating the structure of an account book service providing system according to an exemplary embodiment.

Reference will now be made in detail to embodiments of the present invention, examples of which are illustrated in the accompanying drawings. In this regard, the present embodiments may have different forms and should not be construed as being limited to the descriptions set forth herein. Accordingly, the exemplary embodiments are merely described below, by referring to the figures, to explain aspects of the present description.

The inventive concept may be embodied in many different forms and accomplished in various embodiments. Thus, exemplary embodiments are illustrated in the drawings and described in detail below in the present disclosure. Effects and features of the inventive concept and methods of achieving them will be apparent from exemplary embodiments set forth herein, taken in conjunction with the appended drawings. However, the inventive concept is not limited to the following exemplary embodiments and may be realized in various forms. In the following exemplary embodiments, it will be understood that, although the terms 'first', 'second', 'third,' etc., may be used herein to describe various elements, components, regions, layers and/or sections, these elements, components, regions, layers and/or sections should not be limited by these terms. These terms are only used to distinguish one element, component, region, layer or section from another region, layer or section. Also, the singular forms 'a', 'an' and 'the' are intended to include the plural forms as well, unless the context clearly indicates otherwise. It will be further understood that the terms 'comprise' and/or 'comprising,' when used in this specification, specify the presence of stated features, integers, steps, operations, elements, and/or components, but do not preclude the presence or addition of one or more other features, integers, steps, operations, elements, components, and/or groups thereof. For convenience of explanation, in the drawings, the sizes of elements may be exaggerated or decreased. For example, the sizes and thicknesses of elements illustrated in the drawings are arbitrarily determined for convenience of explanation and thus the inventive concept are not limited thereto.

As used herein, the term 'and/or' includes any and all combinations of one or more of the associated listed items. Expressions such as 'at least one of,' when preceding a list of elements, modify the entire list of elements and do not modify the individual elements of the list.

Hereinafter, exemplary embodiments will be described in detail, in which like elements are denoted by like reference numerals throughout and are not redundantly described here.

FIG. 1 is a diagram illustrating the structure of an account book service providing system 1 according to an exemplary embodiment.

Referring to FIG. 1, the account book service providing system 1 according to an exemplary embodiment includes an account book service providing apparatus 100 and a plurality of user terminals 300. The account book service providing system 1 further includes a communication network 400 connecting the plurality of user terminals 300 and the account book service providing apparatus 100 to each other.

The account book service providing apparatus 100 according to an exemplary embodiment provides a messenger service, whereby when a user transmits an income/expenditure detail to the account book service providing apparatus 100 by inputting the income/expenditure detail in a simple dialogue form into a chat window between the user and a virtual account book manager. The account book service providing apparatus 100 automatically converts the income/expenditure detail into an appropriate format, stores and updates the income/expenditure detail in an account book database, and displays gathered data, such as accumulated expenditure details of a target month, in the chat window between the user and the account book manager, so that the user may easily check the income/expenditure details, as will be described in detail with reference to FIG. 2 below.

Here, the account book service providing apparatus 100 according to an exemplary embodiment may be a server providing a chat service using a messenger. Although FIG. 1 illustrates one server, a plurality of servers may be present according to traffic or the amount of data.

The account book service providing apparatus 100 may provide not only a chat service but also a general search service and other various services that increase user convenience. That is, the account book service providing apparatus 100 may provide not only a chat service but also other various services, such as a search service, an email service, a blog service, a social network service, a news service, a shopping information providing service, etc. Preferably, these services are provided to the user terminals 300 through a messaging application or app installed in the user terminals 300.

Alternatively, the account book service providing apparatus 100 may be a server connected to a portal service server providing a search service, an email service, a news service, a shopping service, etc., and configured to provide a web page provided from the portal service server to a user terminal 300 that requests the portal service server to provide information. Here, the account book service providing apparatus 100 and the portal service server may be different servers that are physically separated from each other or may be the same server that is conceptually divided.

The account book service providing apparatus 100 may store chats conducted between the plurality of user terminals 300. Although FIG. 1 illustrates that data is exchanged between the plurality of user terminals 300 via the account book service providing apparatus 100, data may be directly exchanged between the plurality of user terminals 300 via the communication network 400.

The account book service providing apparatus 100 may provide the plurality of user terminals 300 with not only a messenger service and an account book service but also a general search service and various other services that increase user convenience. That is, the account book service providing apparatus 100 according to an exemplary embodiment may provide various services such as a search service, an email service, a blog service, a news service, a shopping information providing service, etc.

The plurality of user terminals 300 refer to communication terminals capable of using a web service in a wire/wireless communication environment. Here, the user terminals 300 may be understood to be personal computers 301 or portable terminals 302 belonging to users. Although FIG. 1 illustrates that the portable terminals 302 are smart phones, the inventive concept is not limited thereto and any terminal having an application with a web browsing function may be used without limitation as described above.

More specifically, examples of the plurality of user terminals 300 may include, but are not limited to, computers (e.g., a desktop computer, a laptop computer, a tablet personal computer, etc.), media computing platforms (e.g., a cable, a satellite set-top box, a digital video recorder, etc.), handheld computing devices (e.g., a personal digital assistant (PDA), an email client, etc.), any type of cellular phones, other types of computing or communication platforms, etc.

The plurality of user terminals 300 may communicate with one another using texts, etc. In this case, two users may communicate with each other, or three or more users may communicate with one another in one chat window. That is, the plurality of user terminals 300 may exchange messages with one another, and the exchanged messages may be displayed in a chat window displayed on the plurality of user terminals 300.

The communication network 400 connects the plurality of user terminals 300 and the account book service providing apparatus 100 with each other. That is, the communication network 400 refers to a communication network providing an access path via which the plurality of user terminals 300 may access the account book service providing apparatus 100 to exchange data with the account book service providing apparatus 100. Examples of the communication network 400 may include wire networks such as local area networks (LANs), wide area networks (WANs), metropolitan area networks (MANs), integrated service digital networks (ISDNs), etc., and wireless networks such as wireless LANs, CDMA, Bluetooth, satellite communication, etc. but exemplary embodiments are not limited thereto.

Figure 2:
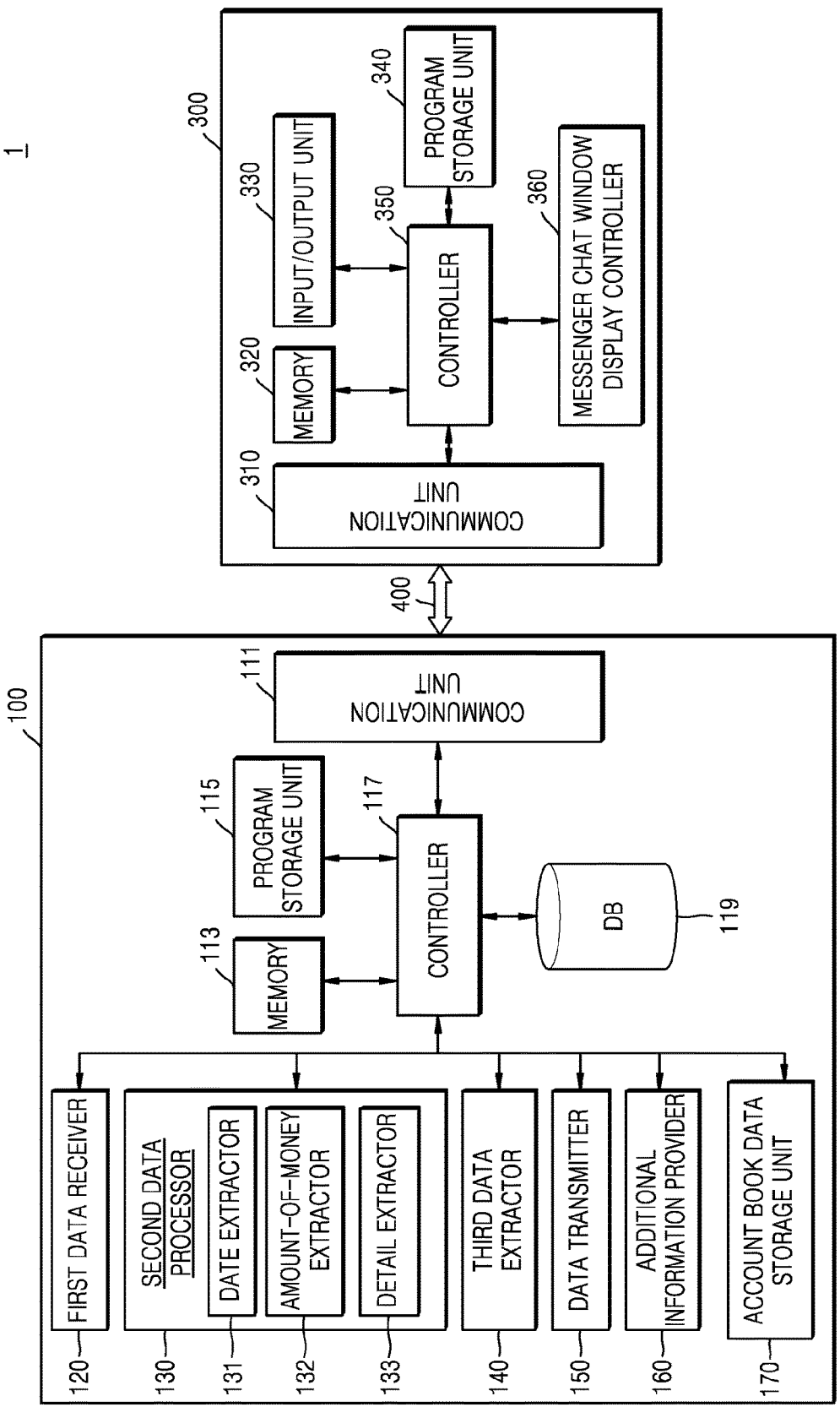
FIG. 2 is a block diagram of the internal structure of an account book service providing system according to an exemplary embodiment.

FIG. 2 is a block diagram of the internal structure of the account book service providing system 1 according to an exemplary embodiment.

Referring to FIG. 2, the account book service providing apparatus 100 of the account book service providing system 1 according to an exemplary embodiment includes a communication unit 111, a memory 113, a program storage unit 115, a controller 117, and a database 119. The account book service providing apparatus 100 further includes a first data receiver 120, a second data processor 130, a third data extractor 140, a data transmitter 150, an additional information provider 160, and an account book data storage unit 170.

In detail, the communication unit 111 is linked to the communication network 400 to provide a communication interface needed to exchange signals (e.g., a control signal or a data signal) between the account book service providing apparatus 100 and the user terminal 300. Here, the communication unit 111 may be a device including hardware and software needed to access another network device in a wire/wireless manner so as to exchange a signal such as a control signal or a data signal with the other network device.

The memory 113 temporarily or permanently store data processed by the controller 117. Here, an example of the memory 113 may include a magnetic storage media or a flash storage media but exemplary embodiments are not limited thereto.

The program storage unit 115 stores control software for performing the work of receiving first data from the user terminal 300, the work of converting the first data into second data, the work of extracting third data based on the second data, etc.

The controller 117 is a type of a central processing unit (CPU), and controls the whole process of receiving the first data from the user terminal 300, editing the first data into the second data in a preset format and storing the second data, extracting the third data based on the second data, and transmitting the third data to the user terminal 300. That is, the controller 117 performs various functions, e.g., running a control program installed in the program storage unit 115 receiving an income/expenditure detail from the user terminal 300, processing the income/expenditure detail, storing the processed income/expenditure detail in a database, and transmitting the processed income/expenditure detail to the user terminal 300.

Examples of the controller 117 may include various types of devices capable of processing data, e.g., a processor. Here, the processor may be understood as, for example, a data processing device included in hardware and including a circuit physically configured to perform a function expressed using code or instructions included in a program. Examples of the data processing device included in hardware as described above may include various processing devices such as a microprocessor, a CPU, a processor core, a multiprocessor, an application-specific integrated circuit (ASIC), a field programmable gate array (FPGA), etc., but exemplary embodiments are not limited thereto.

The database 119 includes an account book database configured to store account book data provided from the account book service providing apparatus 100. The account book database may store the details of each of incomes or expenditures. The details of each of the incomes or expenditures may include items used as basic journalizing factors in accounting, e.g., a date, the amount of money, an abstract, a debt side, a credit, etc. Furthermore, the database 119 may further include a user database for storing user information. Here, the user database may store user information regarding a user who requests an account book service. Here, the user information may include basic information regarding the user (e.g., the user's name, a group to which the user belongs, the user's personal data, sex, age, etc.), the user's login information (e.g., identification (ID), a password, etc.), access information (e.g., an access country, an access location, information regarding a device used to the access, an accessed network environment, etc.), and the like.

Also, although not shown, the account book service providing apparatus 100 according to an exemplary embodiment may further include an input/output (I/O) unit, etc.

The account book service providing apparatus 100 further includes the first data receiver 120, the second data processor 130, the third data extractor 140, the data transmitter 150, and the additional information provider 160. These components or units may be any devices capable of processing data including, for example, a processor. The term 'processor', as used herein refers to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multiprocessor, an application-specific integrated circuit (ASIC), and a field programmable gate array (FPGA). In another embodiment the first data receiver 120, the second data processor 130, the third data extractor 140, the data transmitter 150, and the additional information provider 160 of the account book service providing apparatus 100 may also be implemented as software programs, such as an application program (i.e., app or application), which are executed in one or more hardware devices such as a processor.

According to an exemplary embodiment, an account book service, which is in a messenger service, is provided whereby a virtual account book manager which is a concept of bot is set, and when a user transmits an income or expenditure detail to the account book service providing apparatus 100 by inputting the income or expenditure detail in a simple dialogue form into a chat window between the user and the account book manager, the account book service providing apparatus 100 automatically converts the income or expenditure detail into an appropriate format and stores and updates the income or expenditure detail in the database 119, and displays gathered data, such as accumulated expenditure details of a target month, in the chat window between the user and the account book manager, so that the user may easily check the income/expenditure details.

Here, the term "bot" is an abbreviation for a robot and refers to a program that operates as a representative that imitates a user, another program, or a human behavior. Representative examples of bots existing on the Internet are programs called spider or crawler and configured to periodically visit web sites to gather contents for indexes of a search engine. According to an exemplary embodiment, a bot acting as an account book manager is provided.

Figure 3:
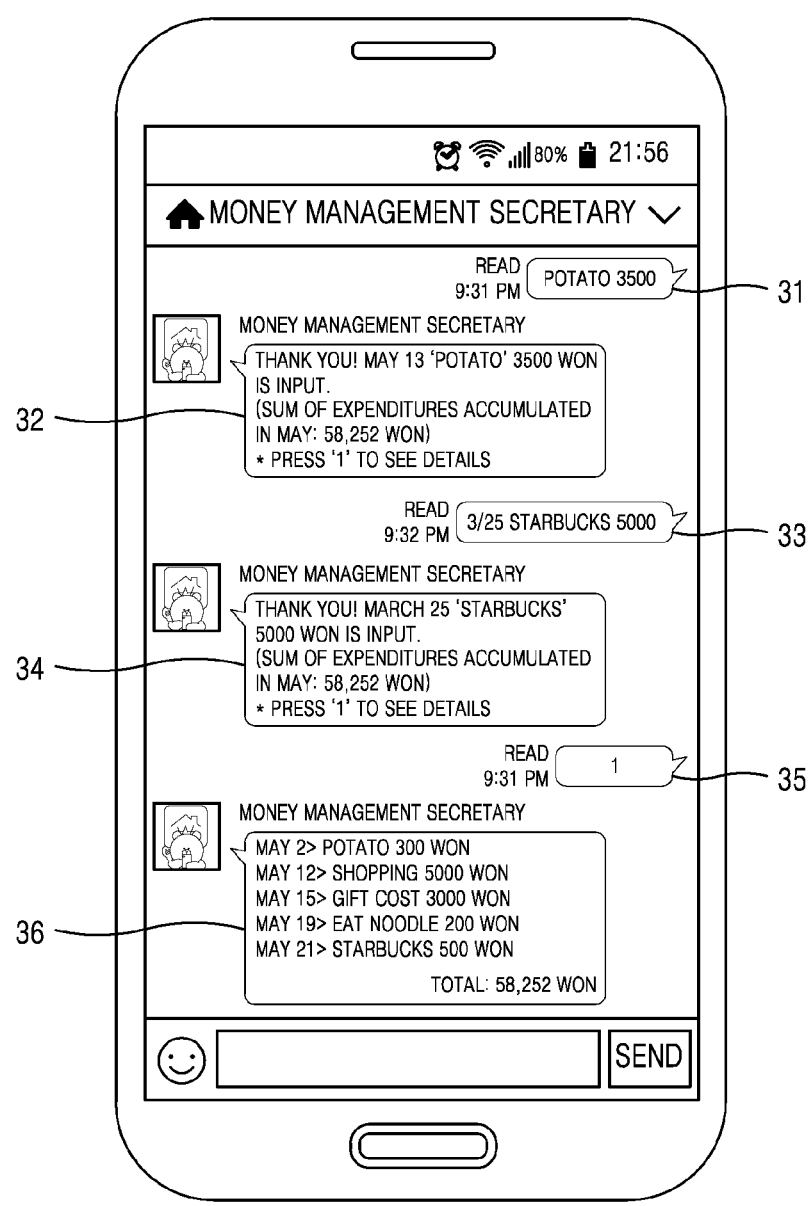
FIGS. 3 to 7 are diagrams illustrating account book management performed through conversation conducted between a user and a virtual account book manager through a messenger chat window displayed on a user terminal, according to exemplary embodiments.
Figure 5:
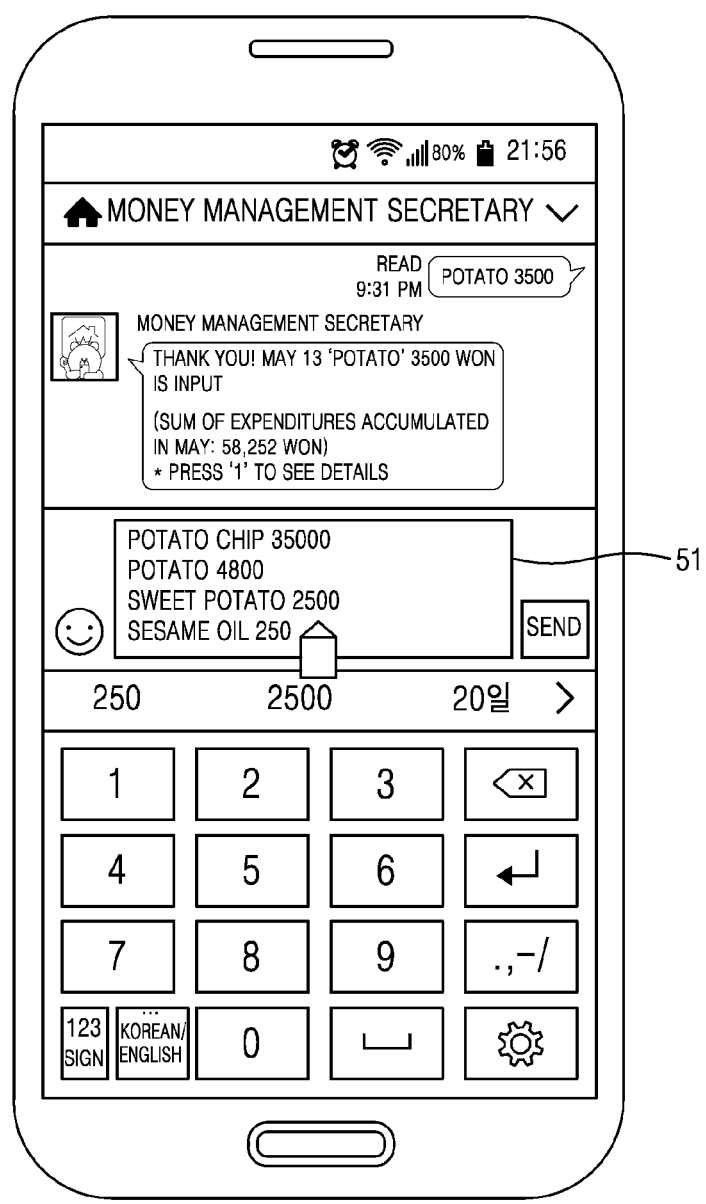
Figure 6:
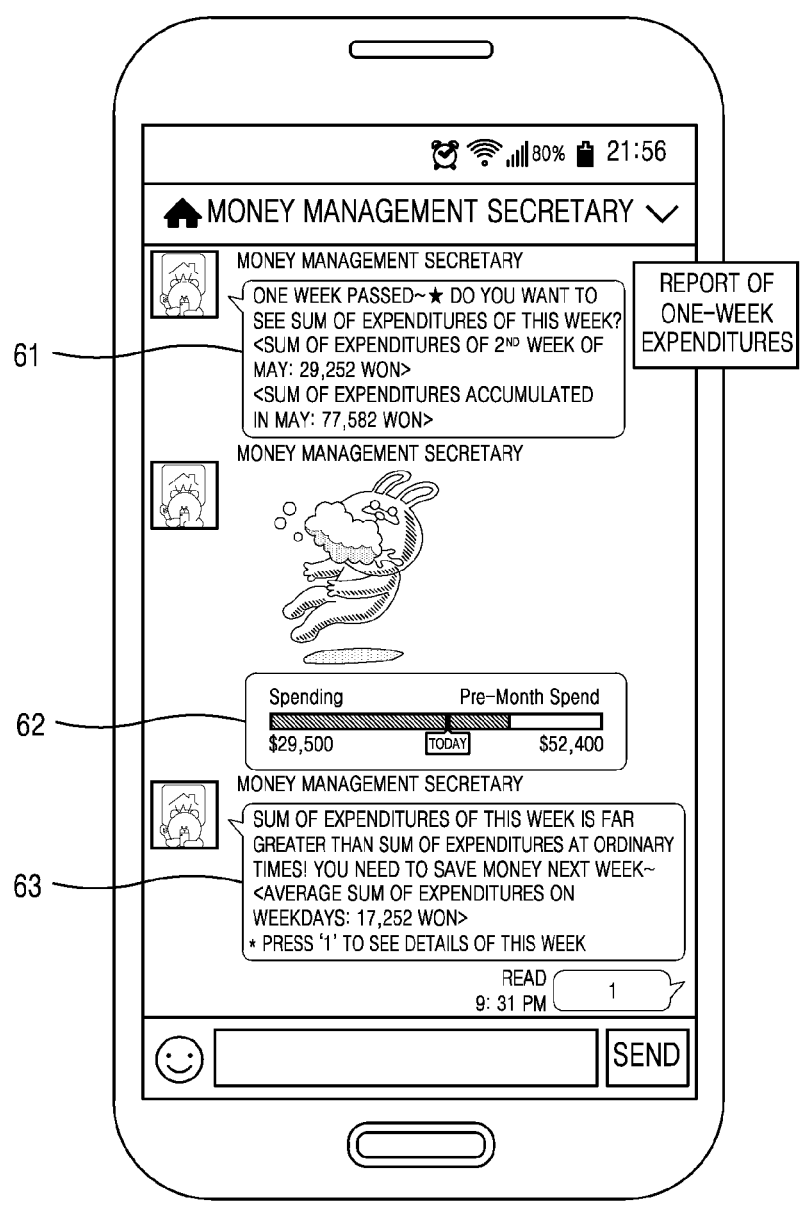
Figure 7:
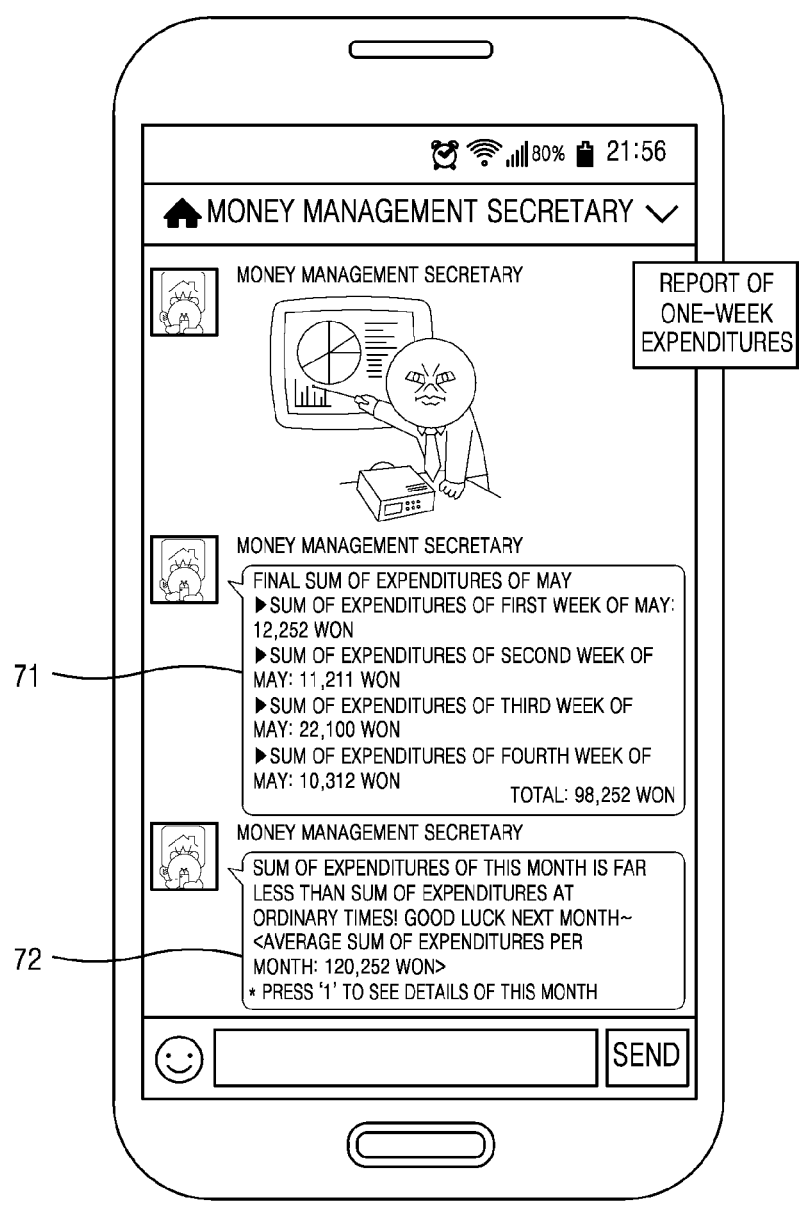

For example, FIGS. 3 to 7 are diagrams illustrating account book management performed through conversation conducted between a user and a virtual account book manager which is a concept of a bot (which is illustrated as a 'money management secretary' in FIGS. 3 to 7) in a messenger chat window displayed on a user terminal 300 according to exemplary embodiments, as will be described in more detail with reference to FIGS. 2, 3, and 7 below.

The first data receiver 120 receives first data including an income or expenditure detail which is input into the messenger chat window displayed on the user terminal 300. For example, as illustrated in FIG. 3, a user inputs first data including an income or expenditure detail into a chat window provided from a messenger service. That is, the user may input first data including an income or expenditure detail, e.g., 'potato 3500' shown in a message output portion 31 or '3/25 Starbucks 5000' shown in a message output portion 33. That is, the user may transmit the first data to the account book service providing apparatus 100 by inputting the first data in any of various forms.

The second data processor 130 edits the received first data into second data in a preset format. In detail, the user may transmit the first data to the account book service providing apparatus 100 by inputting, as the first data, at least some of account book items in various formats. Then the account book service providing apparatus 100 converts the first data into a standard format and stores the first data in a database. To this end, the second data processor 130 further includes a date extractor 131, an amount-of-money extractor 132, and a detail extractor 133.

The date extractor 131 extracts date data from a character string received by the first data receiver 120. The date extractor 131 may extract a date based on number data included in the character string or extract the date data based on an expression representing a date from the character string.

More specifically, the date extractor 131 according to an exemplary embodiment provides a method of enabling a user to directly designate a date using numbers, for example, to be '2013-08-24' or a method of designating a date relative to a reference date to be, for example, 'today', 'tomorrow', '−1 (one day before today)', '+3 (three days after today)', etc.

To this end, first, the date extractor 131 searches the first data for characters designated beforehand, e.g., a word 'today', 'tomorrow', 'yesterday', 'two days after tomorrow', or 'the day after yesterday'. When such a word is searched for from the first data, a character string corresponding to the searched word is extracted, and an absolute date of an addition/subtraction date indicated by the searched word is calculated with respect to today which is a point of time when the first data is input by using a preset variable (e.g., '+1' for tomorrow, '−1' for yesterday, etc.). The calculated date (i.e., a date that the user wants to input) is extracted and set as date data.

Second, when a date is not designated according to the above method, the date extractor 131 searches for a numerical expression directly designating a date using a value, e.g., −1, +1, −3, etc. Similarly, when a character string including the regular expression is searched for, an absolute date is calculated from the character string with respect to today which is a point of time when the first data is input. The calculated date (i.e., the date that the user wants to input) is extracted and set as date data.

Third, when the date extractor 131 does not obtain any date data according to either the first or second method, a regular expression directly representing a date is searched for. Then it is determined whether the regular expression is written using a date such as 'yyyy-mm-dd' or 'yy-mm' or a general date expression such as 'yyyy/mm/dd' or 'mm/dd'. For example, when the first data is '2013-08-24 snack bar gimbap cash type 2500', "2013-08-24" is recognized and extracted as a date value and thus a character string "snack bar gimbap cash type 2500" remains. If a year is not included in the date value, the current year may be designated such that the finally calculated date is a whole date value, e.g., yyyy-mm-dd. The date extractor 131 extracts and sets the finally calculated date value as date data. That is, as shown in a message output portion 33 of FIG. 3, when a user inputs first data '3/25 Starbucks 5000', the date extractor 131 may extract and set, as date data, "March 25" described in the form of mm/dd or "March 25, 2015" described in the form of yyyy-mm-dd.

Lastly, when a relative or absolute date is not included in collected character strings, the date extractor 131 directly calculates a date which is a present point of time, i.e., the date of today, and extracts and sets the calculated date as date data in a terminal. That is, as shown in the message output portion 31 of FIG. 3, when a user inputs first data 'potato 3500' without inputting a date, the date extractor 131 may directly calculate the date of today (e.g., May 13) and extract and set the date of today as date data in the terminal.

The amount-of-money extractor 132 extracts amount-of-money data from the received first data. Generally, similar to a date, an amount of money has a form that may be used solely from among financial transaction items used in an account book. Thus, according to an exemplary embodiment, amount-of-money data and date data are extracted earlier than the other items (an account item, an abstract, etc.). A value of an amount of money extracted by the amount-of-money extractor 132 may be a value including a decimal point, e.g., '23.99', or may be a value including a comma, e.g., '2,000' if a user wants. As described above, when an input character value is 'potato 3500', "3500" may be extracted as amount-of-money data.

In this case, the amount-of-money extractor 132 may determine the type of currency based on location information of the user terminal 300. For example, the location information of the user terminal 300 may be transmitted to the account book service providing apparatus 100 from the user terminal 300 when the user terminal 300 accesses a messenger service or transmits the first data. Also, the amount-of-money extractor 132 may determine the currency based on the location information of the user terminal 300 when the amount-of-money data is extracted from the first data. That is, if a result of analyzing the location information of the user terminal 300 reveals that the user terminal 300 is located in South Korea, South Korean won (KRW) may be determined as the currency when a currency is not additionally input. If the user terminal 300 is located in Japan, Japanese yen (JPY) may be determined as the currency when a currency is not additionally input. When shop name information (e.g., Starbucks in Samcheong, etc.) of a shop where a user has paid is transmitted along with the first data, the location information of the user terminal 300 may be extracted based on the shop name information and the currency may be determined based on the location information.

The detail extractor 133 extracts the income or expenditure detail from a character string of the first data, excluding the date data and the amount-of-money data. In detail, an abstract, a debt side, a credit, etc. may be extracted as financial transaction factors from a character string of the first data from which the date data and the amount-of-money data are extracted. The detail extractor 133 extracts the income or expenditure detail from this character string.

Alternatively, the detail extractor 133 may extract the income or expenditure detail based on the first data, determine a category to which the extracted detail belongs, and add information regarding the category to the income or expenditure detail. For example, words 'breakfast', 'lunch', 'supper, and 'coffee' may be set beforehand to correspond to a 'food expense' category. When a user inputs 'breakfast 3500 won', a category of the 'breakfast 3500 won' may be automatically classified and stored as the category 'food expense'.

Accordingly, the second data processor 130 may extract date data, amount-of-money data, and detail data in an appropriate format from first data that a user inputs into a messenger window.

The account book data storage unit 170 stores second data extracted by the second data processor 130 in the database 119. That is, the account book data storage unit 170 stores the second data extracted by the second data processor 130 in the data base 119 such that the second data is connected to a user.

For example, when a user inputs first data 'potato 3500' as shown in the message output portion 31, the second data processor 130 may extract the date of today as date data, extract '3500' as amount-of-money data, extract 'potato' as detail data, and store them in the database 119. When the user inputs first data '3/25 Starbucks 5000' as shown in the message output portion 33, the second data processor 130 may extract 'March 25' as date data, extract '5000' as amount-of-money data, and extract 'Starbucks' as detail data, and the account book data storage unit 170 stores them in the database 119. Then, the second data extracted and stored as described above may be transmitted to the user terminal 300 by the data transmitter 150, and displayed on the user terminal 300.

The third data extractor 140 extracts third data including the sum of the total or some of the second data from the second data. For example, when the second data processor 130 extracts the date of today as date data, '3500' as amount-of-money data, 'potato' as detail data and stores them in the database 119, the third data extractor 140 may extract, as third data, an amount of money calculated by adding '3500' to the sum of expenditures of this month, and provide the third data to the user terminal 300.

The data transmitter 150 transmits the second data or the third data to the user terminal 300 so as to display them on the user terminal 300.

For example, when a user inputs first data including an income or expenditure detail, e.g., 'potato 3500', as shown in the message output portion 31, the second data processor 130 extracts the data of today, e.g., May 13, "3500" as amount-of-money data, and "potato" as detail data from the first data. Also, the third data extractor 140 extracts and stores, as third data, 58252 won which is an amount of money calculated by adding 3500 won to the sum of expenditures of this month. Then the data transmitter 150 transmits the second data and the third data to the user terminal 300, and thus the second data 'May 13, potato, 3500 won' and the third data 'the sum of expenditures accumulated as from May is 58252 won' are displayed in the message output portion 32 of the user terminal 300.

Similarly, when a user inputs first data including an income or expenditure detail, e.g., '3/25 Starbucks 5000' shown in the message output portion 33, the second data processor 130 extracts 'March 25' as date data, '5000' as amount-of-money data, and 'Starbucks' as detail data from the first data. Then the third data extractor 140 extracts the sum of expenditures of this month. However, the '5000' won was spent on March and thus the sum of expenditures of this month, i.e., May, does not change. The data transmitter 150 transmits second data and third data to the user terminal 300. Thus, second data 'March 25, Starbucks, 5000 won' and third data "the sum of expenditures accumulated as from Mary is 58252 won' are displayed in a message output portion 34 of the user terminal 300.

When first data received by the first data receiver 120 includes a preset identifier, the third data extractor 140 may provide the user terminal 300 with the details of incomes or expenditures for a predetermined time period.

For example, when a user inputs '1' representing detail data as first data as shown in a message output portion 35 and the first data receiver 120 receives '1', the second data processor 130 determines whether the first data is a preset identifier and determines that the first data is '1' representing the detail data. Then the third data extractor 140 extracts income or expenditure details of a target month. The data transmitter 150 transmits the income or expenditure details to the user terminal 300. Current income or expenditure details of May are displayed in a message output portion 36 of the user terminal 300.

When amount-of-money data is not included in first data received by the first data receiver 120, the third data extractor 140 may provide the user terminal 300 with data related to either date data or detail data extracted from the first data.

For example, when a user inputs only 'Starbucks', the third data extractor 140 may extract all of the details related to 'Starbucks' as detail data or details related to 'Starbucks' as detail data for a certain time period, and provide the user terminal 300 with the extracted details. Alternatively, when the user inputs only 'May 1', the third data extractor 140 may extract all of the details related to 'May 1' as date data and provide the user terminal 300 with the extracted details.

Figure 4:
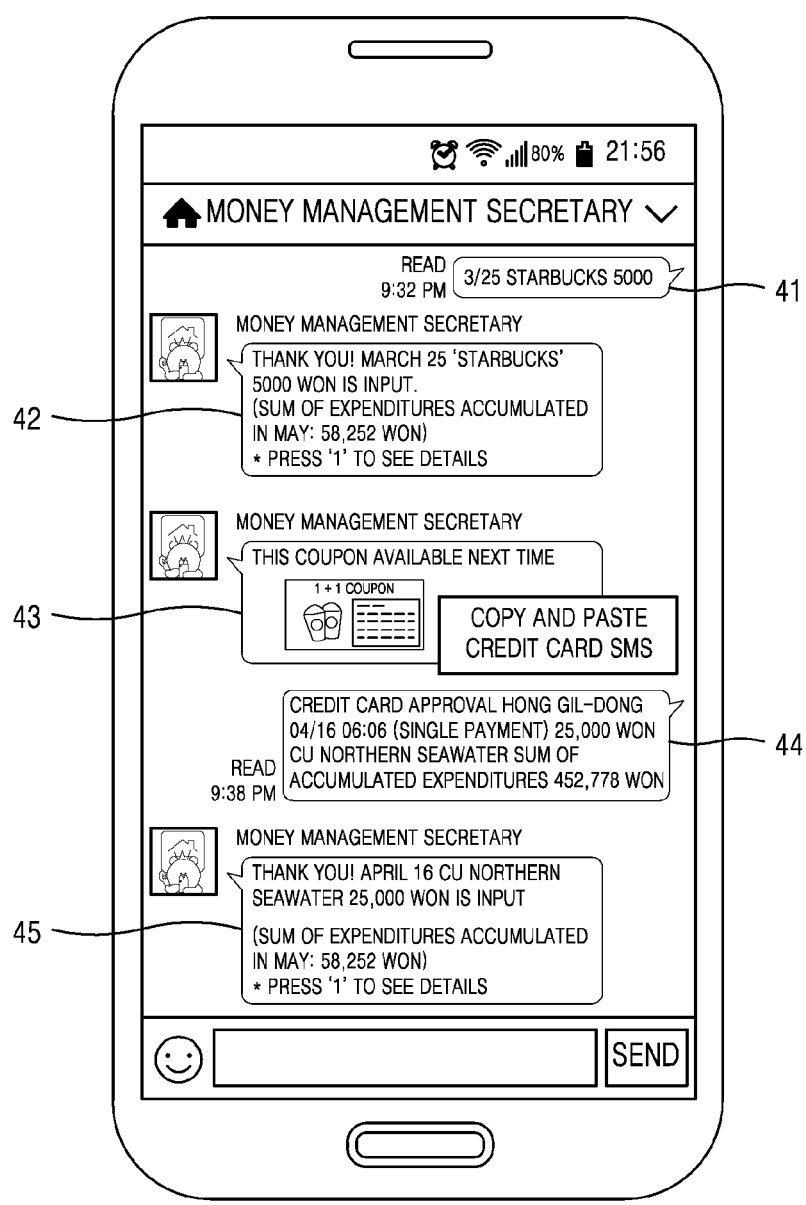

According to an exemplary embodiment, the account book service providing apparatus 100 further includes the additional information provider 160 configured to extract additional information corresponding to received first data and provide the additional information to the user terminal 300. The additional information may include coupon information, discount information, and event information corresponding to the first data. For example, as illustrated in FIG. 4, a user inputs first data including an income or expenditure detail into a chat window provided from a messenger service. That is, as shown in a message output portion 41, the user may input first data including an income or expenditure detail, e.g., '3/25 Starbucks 5000'. Then second data 'March 25, Starbucks, 5000 won' and third data 'the sum of expenditures accumulated as from May is 58252 won' are displayed in a message output portion 42 of the user terminal 300 according to the above process. Additional information related to 'Starbucks' as detail data, e.g., coupon information, discount information, event information, etc., may be further displayed in a message output portion 43.

In the account book service providing apparatus 100 according to an exemplary embodiment, first data may be a text message regarding a credit card use detail received by the user terminal 300. For example, as illustrated in FIG. 4, a text message regarding a card use detail received by the user terminal 300 may be input into a message output portion 44. In this case, when the user terminal 300 receives the text message regarding the card use detail, the text message may be automatically input or a user may copy the text message and paste it into a chat window. When first data is input as described above, second data and third data may be displayed in a message output portion 45 of the user terminal 300 according to the above process.

In the account book service providing apparatus 100 according to an exemplary embodiment, first data may include a plurality of income or expenditure details. For example, as illustrated in FIG. 5, all of a plurality of income or expenditure details may be input into a message input portion 51. The second data processor 130 may extract, as second data, the date, the amount of money, and the detail corresponding to each of the plurality of income or expenditure details by dividing the plurality of income or expenditure details into each income or expenditure detail.

In the account book service providing apparatus 100 according to an exemplary embodiment, the third data extractor 140 may extract the sum of the total or some of incomes or expenditures for a certain time period at a predetermined point of time, and provide the user terminal 300 with the extracted incomes or expenditures. In this case, the third data extractor 140 may also provide evaluation data of the extracted incomes or expenditures, for example, "The sum of expenditures for this week is less than the sum of expenditures at ordinary times," or "The sum of expenditures for this week is greater the sum of expenditures at ordinary times."

FIG. 6 illustrates a screen displayed on the user terminal 300 on weekends, in which the sum of incomes or expenditures for one week is displayed. In a message input portion 61, the sum of incomes or expenditures for one week (e.g., the second week of May) and the sum of incomes or expenditures from the beginning of the month of May may be displayed. In a message input portion 62, data regarding a current expenditure detail compared to a previous expenditure detail may be displayed as evaluation data. In a message input portion 63, an evaluation comment as to whether the sum of expenditures for this week is less or greater than the sum of expenditures in a typical week may be displayed as evaluation data of the expenditures for this week.

FIG. 7 illustrates a screen displayed on the user terminal 300 on weekends, in which the sum of incomes or expenditures for an entire month is displayed. In a message input portion 71, the sum of incomes or expenditures for one month (e.g., May) may be displayed. In this case, the sum of incomes or expenditures for each of weeks of May may be also displayed. In a message input portion 72, an evaluation comment as to whether the sum of expenditures of this month is less or greater than the sum of expenditures in a typical month may be displayed as evaluation data of the expenditures for this month.

Although not shown, a plurality of users may join a chat conducted in a messenger chat window. The third data extractor 140 may provide, in the messenger chat window, additional third data reflecting only first data input into the messenger chat window by the plurality of users who join the chat in the messenger chat window. That is, the account book service providing apparatus 100 according to an exemplary embodiment may provide not only an account book service for an individual but also an account book service for an entire chat room. For example, when each of a plurality of users inputs first data in a state in which the plurality of users and a virtual account book manager join the chat in the messenger chat window, the first data input by each of the plurality of users may be stored in an account book database of each of the plurality of users together with an identifier of the messenger chat window. Also, the third data extractor 140 may provide additional third data reflecting only first data input into a specific messenger chat window to the messenger chat window.

According to exemplary embodiments, a user may freely input account book items regardless of method and order, and the date, the amount of money, and the details may be extracted and automatically updated in an account book based on the input account book items, thereby easily keeping an account book. Also, according to exemplary embodiments, dates, amounts of money, and details are arranged and displayed in real time based on the value of a character string input by a user, so that the user may input desired financial transaction factors by inputting a minimum number of factors. Also, according to exemplary embodiments, the sum of expenditure details for a certain time period may be displayed on a user terminal along with details input by a user, so that the user may more easily manage expenditures.

The user terminal 300 according to an exemplary embodiment is further described below.

Referring back to FIG. 2, the user terminal 300 according to an exemplary embodiment includes a communication unit 310, a memory 320, an input/output unit 330, a program storage unit 340, a controller 350, a messenger chat window display controller 360.

In detail, the communication unit 310 may be a device including hardware and software needed to exchange control signals and data signals with other network apparatuses, e.g., the account book service providing apparatus 100, in a wire/wireless manner. For example, the communication unit 310 may include a short-range wireless communication unit or a mobile communication unit. Examples of the short-range wireless communication unit may include, but are not limited to, a Bluetooth communication unit, a Bluetooth low energy (BLE) communication unit, a near-field communication unit, a WLAN (Wi-Fi) communication unit, a Zigbee communication unit, an infrared data association ((IrDA) communication unit, a Wi-Fi Direct (WFD) communication unit, an ultra wideband (UWB) communication unit, an Ant+ communication unit, etc. The mobile communication unit exchanges a radio signal with at least one among a base station, an external terminal, and a server in a mobile communication network. Examples of the radio signal may include various types of data generated during exchange of a voice call signal, a video call signal, or a text/multimedia message.

The memory 320 may temporarily or permanently store data processed by the controller 350 or content data transmitted to the user terminal 300. An example of the memory 320 may include a magnetic storage media or a flash storage media but exemplary embodiments are not limited thereto.

Although not shown, the input/output unit 330 may include a display unit and an input unit.

The display unit may display a messenger chat window, and second data and third data received from the account book service providing apparatus 100 such as those shown in FIGS. 2-7. When a display unit and a touch pad form a layer structure to manufacture a touch screen, the display unit may be also used as not only an output device but also an input device. The display unit may include a liquid crystal display, a thin-film transistor-liquid crystal display, an organic light-emitting diode, a flexible display, a three-dimensional (3D) display, or an electrophoretic display.

The input unit refers to a means through which a user inputs first data. Examples of the input unit may include, but are not limited to, a key pad, a dome switch, a touch pad (a touch-type capacitive touch pad, a pressure-type resistive overlay touch pad, an infrared sensor-type touch pad, a surface acoustic wave conduction touch pad, an integration-type tension measurement touch pad, a piezo effect-type touch pad, etc.), a jog wheel, a jog switch, etc. The input unit may obtain a user input. For example, the input unit may obtain a user event, a scroll input, a directional-key input, or a touch input having a directional motion related to content data published serially.

The program storage unit 340 includes control software for performing the work of transmitting first data to the account book service providing apparatus 100, the work of receiving second data and third data from the account book service providing apparatus 100 and displaying the second data and the third data, the work of receiving a selection signal from the input/output unit 330, etc.

The controller 350 is a type of CPU and controls a whole process of providing the user terminal 300 with an account book service. That is, the controller 350 provides various functions, e.g., a function of driving control software installed in the program storage unit 340, a function of controlling the messenger chat window display controller 360 to display various types of data in a messenger chat window, etc.

Here, examples of the controller 350 includes various types of devices capable of processing data, e.g., a processor. Here, the processor may be understood to be, for example, a data processing device included in hardware and including a circuit physically configured to perform a function expressed using code or instructions included in a program. Examples of the data processing device included in hardware as described above may include various processing devices such as a microprocessor, a CPU, a processor core, a multiprocessor, an application-specific integrated circuit (ASIC), a field programmable gate array (FPGA), etc., but exemplary embodiments are not limited thereto.

The messenger chat window display controller 360 controls a messenger chat window to be displayed on the input/output unit 330 of the user terminal 300, e.g., a touch panel display, under control of the controller 350.

Figure 8:
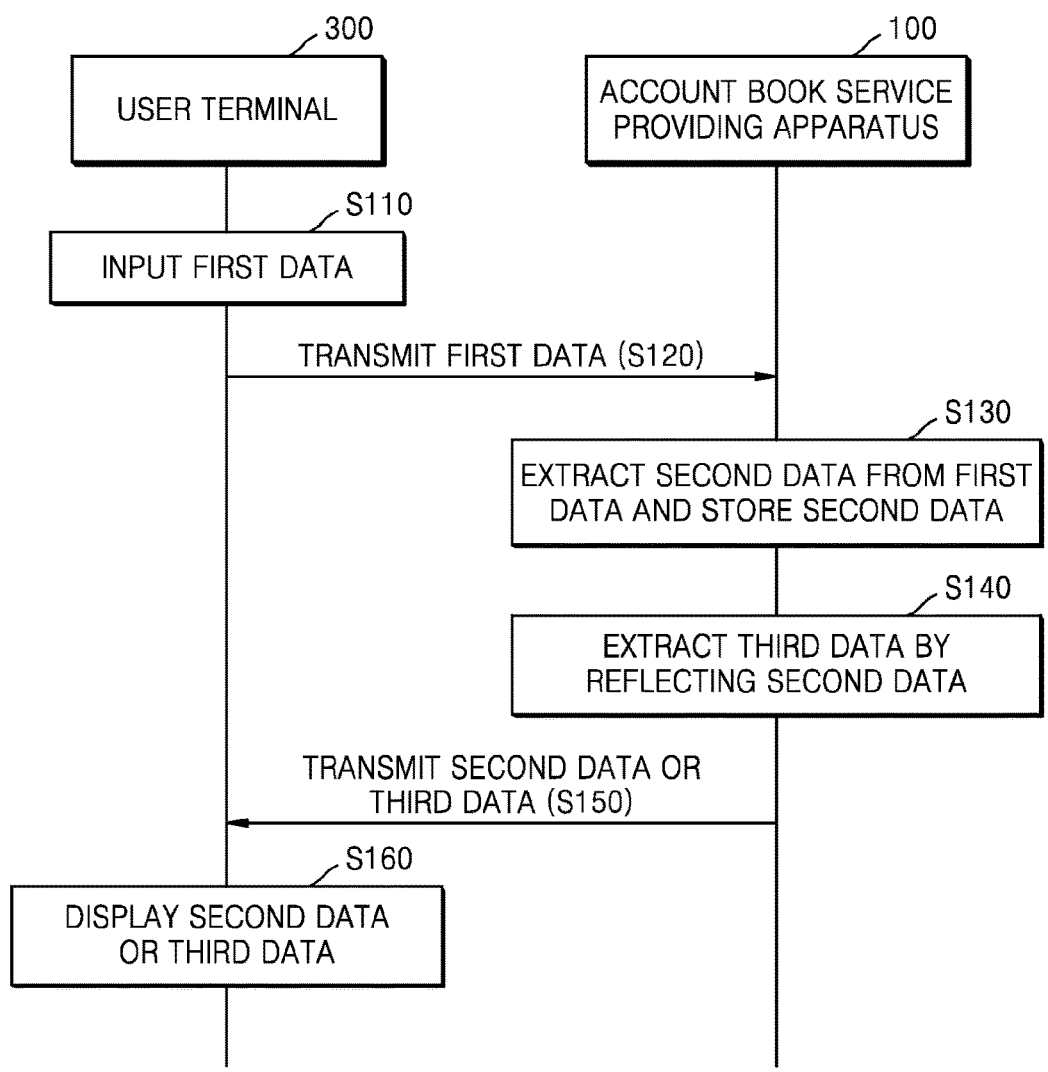
FIG. 8 is a flowchart of a method of providing an account book service according to an exemplary embodiment.

A method of providing an account book service according to an exemplary embodiment will be described below. FIG. 8 is a flowchart of a method of providing an account book service according to an exemplary embodiment.

Referring to FIGS. 2 and 8, a method of providing an account book service according to an exemplary embodiment includes inputting first data into a messenger chat window displayed on the user terminal 300 (operation S110), transmitting the first data from the user terminal 300 to the account book service providing apparatus 100 (operation S120), extracting second data having a preset format from the first data and storing the second data (operation S130), extracting third data including the sum of the total or some of the second data from the second data (operation S140), transmitting the second data or the third data from the account book service providing apparatus 100 to the user terminal 300 (operation S150), and displaying the second or third data on the user terminal 300 (operation S160).

First, first data is input into a messenger chat window displayed on the user terminal 300 (operation S110). Then, the first data is transmitted from the user terminal 300 to the account book service providing apparatus 100 (operation S120). Here, the first data may include an income or expenditure detail. Also, the first data receiver 120 of the account book service providing apparatus 100 receives the first data that includes the income or expenditure detail and that is input into the messenger chat window displayed on the user terminal 300.

Next, second data having a preset format is extracted from the first data and is then stored (operation S130). In detail, when the account book service providing apparatus 100 receives the first data input in various formats, the account book service providing apparatus 100 converts the first data into a standard format and stores the converted first data in a database. To this end, the second data processor 130 includes the date extractor 131, the amount-of-money extractor 132, and the detail extractor 133 to extract date data, amount-of-money data, and detail data from the first data, respectively. Then the account book data storage unit 170 stores the second data extracted by the second data processor 130 in the database 119.

Next, third data including the sum of the total or sum of the second data from the second data is extracted (operation S140). For example, when the second data processor 130 extracts the date of today as date data, '3500 won' as amount-of-money data, and 'potato' as detail data and stores them in the database 119, the third data extractor 140 may extract, as third data, an amount of money calculated by adding 3500 won to the sum of expenditures of this month, and provide the third data to the user terminal 300.

Then, the second or third data is transmitted from the account book service providing apparatus 100 to the user terminal 300 (operation S150), and is displayed on the user terminal 300 (operation S160).

According to exemplary embodiments, a user may freely input account book items regardless of method and order, and the date, the amount of money, and the details may be extracted and automatically updated in an account book based on the input account book items, thereby easily keeping an account book.

Also, according to exemplary embodiments, dates, amounts of money, and details are arranged and displayed in real time based on the value of a character string input by a user, so that the user may input desired financial transaction results by inputting a minimum number of items.

Also, according to exemplary embodiments, the sum of expenditure details for a certain time period may be displayed on a user terminal along with details input by a user, so that the user may more easily manage expenditures.

The one or more of the above exemplary embodiments may be embodied in the form of a computer program that can be run in a computer through various elements. The computer program may be recorded on a non-transitory computer-readable recording medium. Examples of the non-transitory computer-readable recording medium include magnetic media (e.g., hard disks, floppy disks, and magnetic tapes), optical media (e.g., CD-ROMs and DVDs), magneto-optical media (e.g., floptical disks), and hardware devices specifically configured to store and execute program commands (e.g., ROMs, RAMs, and flash memories). Furthermore, the non-transitory computer-readable recording medium may be a formless medium that can be transmitted and distributed in a network, e.g., software or an application.

The computer program may be designed and configured specially for the inventive concept or would be obvious to those of ordinary skill in the field of computer software. Examples of the computer program include not only machine language codes prepared by a compiler but also high-level codes executable by a computer by using an interpreter.

The particular implementations shown and described herein are exemplary embodiments and are not intended to otherwise limit the scope of the inventive concept in any way. For the sake of brevity, conventional electronics, control systems, software development and other functional aspects of the systems may not be described in detail. Furthermore, the lines or connecting elements shown in the appended drawings are intended to represent exemplary functional relationships and/or physical or logical couplings between the various elements. It should be noted that many alternative or additional functional relationships, physical connections or logical connections may be present in a practical device. Moreover, no item or component is essential to the practice of the inventive concept unless it is specifically described as "essential" or "critical".

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. An apparatus for providing an account book service using a messaging service, the apparatus comprising:
a first data receiver configured to receive first data input into a messenger chat window displayed on a terminal of a user, the first data including an income or expenditure detail;
a second data processor configured to extract second data having a preset format from the first data;
an account book data storage unit configured to store the second data to be mapped to the user;
a third data extractor configured to extract third data from the second data, the third data including a sum of a total or some of the second data; and
a data transmitter configured to transmit the second data or the third data to the terminal of the user so as to display the second data or the third data on the terminal of the user;
wherein at least one user and a bot that is a virtual account book manager are displayed in the messenger chat window,
wherein the first data receiver receives a user input signal input through the messenger chat window displayed on the terminal of the user, and
wherein the second data or the third data transmitted by the data transmitter to the terminal of the user is displayed in a form of a chat in the messenger chat window of the terminal of the user.

2. The apparatus of claim 1, wherein the second data processor comprises:
a date extractor configured to extract date data based on the first data;
an amount-of-money extractor configured to extract amount-of-money data, based on the first data; and
a detail extractor configured to extract detail data based on the first data.

3. The apparatus of claim 2, wherein the amount-of-money extractor determines a currency based on location information of the terminal of the user.

4. The apparatus of claim 2, wherein the detail extractor extracts the detail data based on the first data, determines a category to which the extracted detail data belongs, and adds information regarding the category to the detail data.

5. The apparatus of claim 2, wherein, when the first data does not include the amount-of-money data, the third data extractor provides the terminal of the user with data related to either the date data or the detail data extracted from the first data.

6. The apparatus of claim 1, wherein, when the first data includes a preset identifier, the third data extractor provides the terminal of the user with the income or expenditure detail for a predetermined time period.

7. The apparatus of claim 1, wherein the third data extractor extracts a sum of a total or some of incomes or expenditures for a predetermined time period and provides the terminal of the user with the sum of the total or some of incomes or expenditures at a predetermined point of time.

8. The apparatus of claim 7, wherein the third data extractor provides evaluation data of the sum of the total or some of extracted incomes or expenditures along with the sum of the total or some of extracted incomes or expenditures.

9. The apparatus of claim 1, wherein a plurality of users are allowed to join a chat conducted in the messenger chat window,
wherein the third data extractor provides, in the messenger chat window, additional third data reflecting only first data input by the plurality of users who join the chat in the messenger chat window.

10. The apparatus of claim 1, further comprising an additional information provider configured to provide the terminal of the user with additional information including coupon information, discount information, and event information corresponding to the first data.

11. The apparatus of claim 1, wherein the first data comprises a plurality of income or expenditure details.

12. A method of providing an account book service using a messaging service, the method comprising:
receiving, by a first data receiver, first data input into a messenger chat window displayed on a terminal of a user, the first data including an income or expenditure detail;
extracting, by a second data processor, second data having a preset format from the first data;
storing, by an account book data storage unit, the second data to be mapped to the user;
extracting, by a third data extractor, third data from the second data, the third data including a sum of a total or some of the second data; and
transmitting, by a data transmitter, the second data or the third data to the terminal of the user so as to display the second data or the third data on the terminal of the user;
wherein at least one user and a bot that is a virtual account book manager are displayed in the messenger chat window,
wherein the first data receiver receives a user input signal input through the messenger chat window displayed on the terminal of the user, and
wherein the second data or the third data transmitted by the data transmitter to the terminal of the user is displayed in a form of a chat in the messenger chat window of the terminal of the user.

13. The method of claim 12, wherein the extracting of the second data comprises:
extracting, by a data extractor, date data based on the first data;
extracting, by an amount-of-money extractor, amount-of-money data based on the first data; and
extracting, by a detail extractor, detail data based on the first data.

14. The method of claim 13, wherein, when the first data does not include the amount-of-money data, the extracting of the third data comprises extracting data related to either the date data or the detail data extracted from the first data.

15. The method of claim 12, wherein, when the first data includes a preset identifier, the extracting of the third data comprises extracting the income or expenditure detail for a predetermined time period.

16. The method of claim 12, wherein the extracting of the third data comprises extracting a sum of a total or some of incomes or expenditures for a predetermined time period at a predetermined point of time.

17. The method of claim 12, wherein a plurality of users are allowed to join a chat conducted in the messenger chat window,
wherein the extracting of the third data comprises extracting additional third data reflecting only first data input into the messenger chat window by the plurality of users who join the chat conducted in the messenger chat window.

18. The method of claim 12, further comprising providing the terminal of the user with additional information including coupon information, discount information, and event information corresponding to the first data, performed by an additional information provider.

19. A computer program stored in a non-transitory computer-readable recording medium and configured to cause a computer to perform:

receiving, by a first data receiver, first data input into a messenger chat window displayed on a terminal of the user, the first data including an income or expenditure detail;

extracting, by a second data processor, second data having a preset format from the first data;

storing, by an account book data storage unit, the second data to be mapped to the user;

extracting, by a third data extractor, third data to reflect the second data, the third data including a sum of a total or some of the second data; and transmitting, by a data transmitter, the second data or the third data to the terminal of the user so as to display the second data or the third data on the terminal of the user;

wherein at least one user and a bot that is a virtual account book manager are displayed in the messenger chat window, wherein the first data receiver receives a user input signal input through the messenger chat window displayed on the terminal of the user, and wherein the second data or the third data transmitted by the data transmitter to the terminal of the user is displayed in a form of a chat in the messenger chat window of the terminal of the user.

* * * * *